(12) United States Patent
Zarabadi

(10) Patent No.: US 7,932,772 B1
(45) Date of Patent: Apr. 26, 2011

(54) CURVATURE-COMPENSATED BAND-GAP VOLTAGE REFERENCE CIRCUIT

(75) Inventor: Seyed R. Zarabadi, Kokomo, IN (US)

(73) Assignee: Delphia Technologies, Inc., Troy, MI (US)

( * ) Notice: Subject to any disclaimer, the term of this patent is extended or adjusted under 35 U.S.C. 154(b) by 0 days.

(21) Appl. No.: 12/610,659

(22) Filed: Nov. 2, 2009

(51) Int. Cl.
*G05F 1/10* (2006.01)

(52) U.S. Cl. ......................................................... 327/539

(58) Field of Classification Search ................... 327/539; 323/313
See application file for complete search history.

(56) References Cited

U.S. PATENT DOCUMENTS

| | | | |
|---|---|---|---|
| 6,563,370 B2* | 5/2003 | Coady | 327/539 |
| 7,248,098 B1* | 7/2007 | Teo | 327/539 |
| 7,598,799 B2* | 10/2009 | Marinca | 327/539 |
| 7,737,768 B2* | 6/2010 | Byeon | 327/539 |
| 7,839,202 B2* | 11/2010 | Sengupta et al. | 327/539 |

OTHER PUBLICATIONS

Pertijs et al., "A CMOS Smart Temperature Sensor With a 3-Sigma Inaccuracy of +/−0.5 Degrees C. to +120 Degrees C.", IEEE Journal of Solid State Circuits, vol. 40, No. 2, Feb. 2005.

* cited by examiner

*Primary Examiner* — Hai L Nguyen
(74) *Attorney, Agent, or Firm* — Jimmy L. Funke

(57) ABSTRACT

A band-gap reference voltage is developed by a phase-clocked band-gap circuit including a single PN junction through which first and second constant currents are alternately directed. A current proportional to absolute temperature is selectively added to one of the first and second constant currents to curvature-compensate the developed band-gap reference voltage. The band-gap circuit is calibrated at any desired temperature by interrupting the curvature compensation current and trimming the one constant current to bring the un-compensated band-gap reference voltage into correspondence with a nominal band-gap voltage functionally related to the calibration temperature and circuit component values.

9 Claims, 3 Drawing Sheets

CURVATURE-COMPENSATED BAND-GAP VOLTAGE REFERENCE CIRCUIT

TECHNICAL FIELD

The present invention relates to voltage reference circuits, and more particularly to a low-cost high-precision curvature-compensated band-gap voltage reference circuit.

BACKGROUND OF THE INVENTION

Band-gap voltage reference circuits are routinely used in integrated circuit applications that require a reference voltage that is reasonably precise and stable over a range of temperatures. Fundamentally, a band-gap voltage reference circuit includes two bipolar base-emitter junctions operating at different current densities. The reference voltage is obtained by summing one of the base-emitter voltages with a scaled difference of the two base-emitter voltages. Since the base-emitter voltage is inversely proportional to temperature and the scaled difference voltage is directly proportional to temperature, their sum is temperature independent to the first order. However, the reference voltage still exhibits some second and higher order nonlinearity (curvature) with temperature, and various techniques have been developed to compensate for these nonlinearities. For example, the circuitry of the reference generator can be trimmed or calibrated at a number of different temperature settings, and/or various non-linear waveforms can be used to cancel out the non-linearity of the reference. Also, special steps must be taken to minimize stresses caused by the circuit packaging because package stress non-uniformity can introduce additional voltage instability over time.

Conventional approaches for addressing the curvature compensation and package stress issues typically result in a component cost that is too high for many applications. Accordingly, what is needed is a high-precision curvature-compensated band-gap voltage reference circuit that is low in cost, easily calibrated, and substantially insensitive to packaging stresses.

SUMMARY OF THE INVENTION

The present invention is directed to an improved high-precision voltage reference circuit featuring a novel way of generating a curvature-compensated band-gap reference voltage that is substantially insensitive to package stress, and a novel calibration technique that can be carried out at any desired temperature. A band-gap reference voltage is developed by a phase-clocked band-gap circuit including a single PN junction through which first and second constant currents are alternately directed. A current proportional to absolute temperature is selectively added to one of the first and second constant currents to curvature-compensate the developed band-gap reference voltage. The band-gap circuit is calibrated at any desired temperature by interrupting the curvature compensation current and trimming the one constant current to bring the un-compensated band-gap reference voltage into correspondence with a nominal band-gap voltage functionally related to the calibration temperature and circuit component values.

DESCRIPTION OF THE PREFERRED EMBODIMENT

Figure 1:
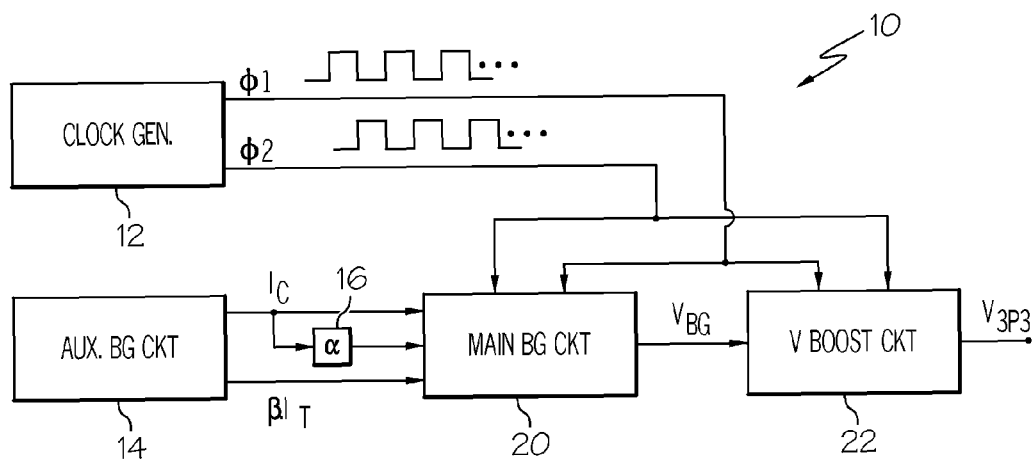
FIG. 1 is a block diagram of a high-precision curvature-compensated band-gap voltage reference circuit according to this invention, including an auxiliary band-gap circuit, a phase-clocked main band-gap circuit, and a phase-clocked voltage boost circuit.

Referring to the drawings, and particularly to FIG. 1, the reference numeral 10 generally designates a high-precision curvature-compensated band-gap voltage reference circuit according to this invention, including a two-phase clock generator 12, an auxiliary band-gap circuit 14, a trimable scaling parameter 16, a main band-gap circuit 20, and a voltage-boost circuit 22. The clock generator develops a pair of fixed-frequency non-overlapping opposite-phase square-wave signals $\phi 1$ and $\phi 2$ for the main band-gap and voltage-boost circuits 20 and 22. The auxiliary band-gap circuit 14, described in detail below in reference to FIG. 2, develops two signals needed by the main band-gap circuit 20, which signals may be developed by some other means if desired. The signals developed by auxiliary band-gap circuit 14 are current signals, and include: a substantially constant current $I_C$, and a scaled current $\beta \cdot I_T$ that is proportional-to-absolute-temperature (PTAT). The block 16 generates a trim-able scaling parameter cc, which is used to form a scaled version ($\alpha \cdot I_C$) of the constant current $I_C$.

Figure 3:
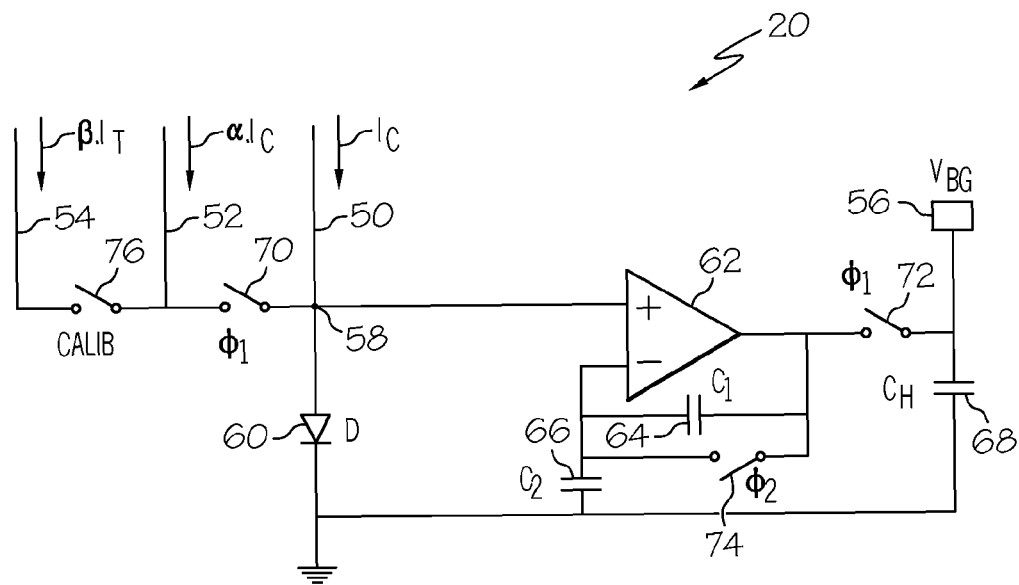
FIG. 3 is a simplified circuit diagram of the phase-clocked main band-gap circuit of FIG. 1.

The main band-gap circuit 20, described in detail below in reference to FIG. 3, is phase-clocked by $\phi 1$ and $\phi 2$ and develops a high-precision curvature-compensated band-gap voltage $V_{BG}$. In general, the two constant input currents $I_C$ and $\alpha \cdot I_C$ are used to generate a band-gap reference voltage using a single PN junction, and the scaled PTAT input current $\beta \cdot I_T$ is used to curvature-compensate the generated band-gap reference voltage $V_{BG}$, using the same PN junction. Using a single PN junction (a diode in the illustrated embodiment) to create the curvature-compensated band-gap reference voltage $V_{BG}$ minimizes sensitivity to package stresses that diversely affect different devices on an integrated circuit because in this circuit the package stress error is subject to common mode cancellation. In the illustrated embodiment, the uncompensated band-gap reference voltage $V_{UBG}$ has a nominal value of 1.116 VDC at a nominal room temperature of 40° C., and the curvature-compensated band-gap reference voltage $V_{BG}$ has a nominal value of 1.18 VDC at that same temperature.

Figure 4:
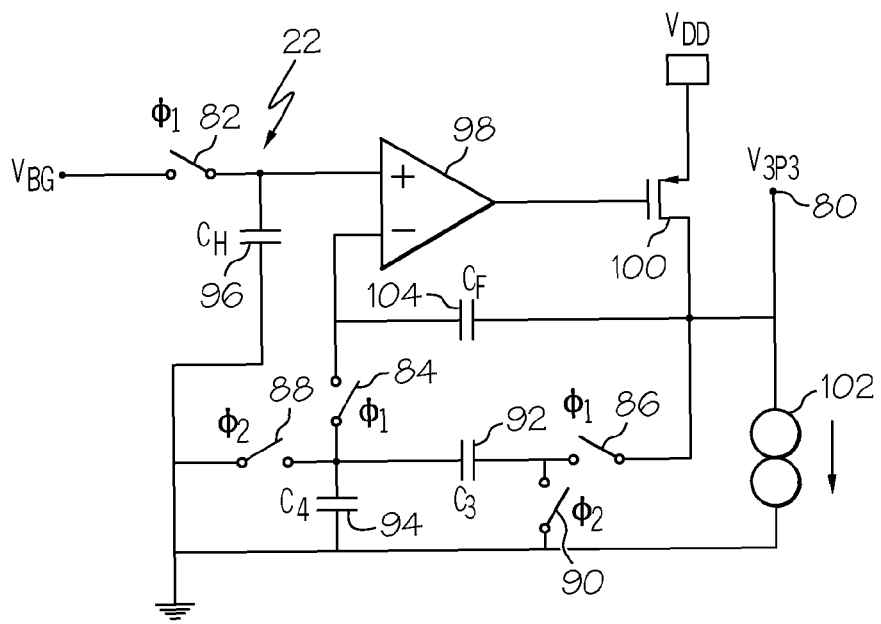
FIG. 4 is a simplified circuit diagram of the phase-clocked voltage boost circuit of FIG. 1.

The voltage boost circuit 22, described in detail below in reference to FIG. 4, is also phase-clocked by $\phi 1$ and $\phi 2$. The voltage boost circuit 22 boosts the curvature-compensated band-gap voltage $V_{BG}$ by a calibrated factor to form an elevated high-precision reference voltage $V_{3P3}$. In the illustrated embodiment the reference voltage $V_{3P3}$ has a nominal value of 3.3 VDC.

Figure 2:
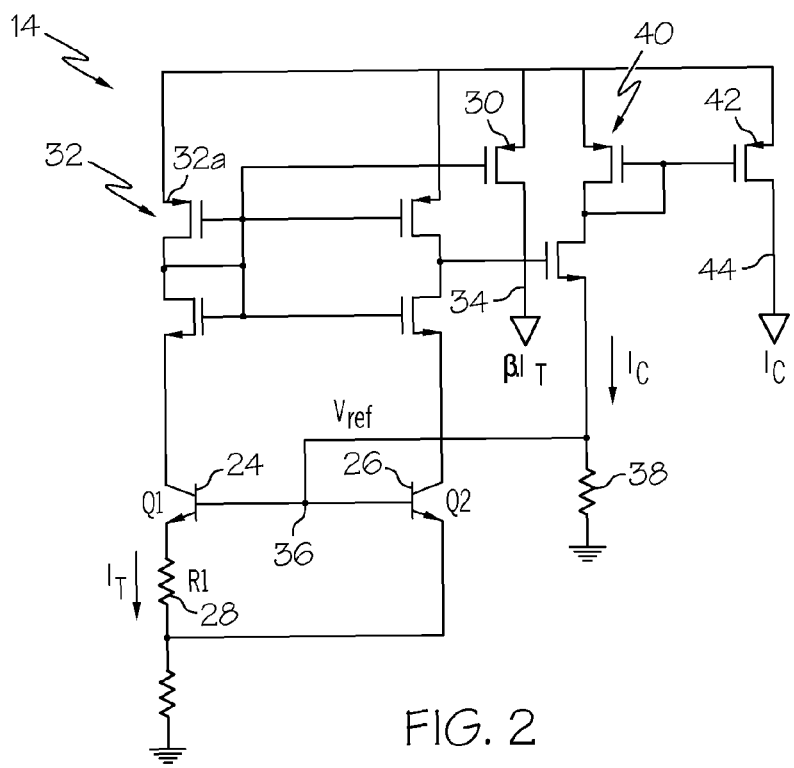
FIG. 2 is a simplified circuit diagram of the auxiliary band-gap circuit of FIG. 1.

Referring to FIG. 2, the auxiliary band-gap circuit 14 may be a conventional band-gap circuit of average precision, including first and second bipolar transistors 24 and 26 having different active areas. The current $I_T$ in resistor 28 is a PTAT current, as can be demonstrated by summing the voltages in a circuit loop including resistor 28 and the base-emitter circuits of transistors 24 and 26. The collector current of transistor 24 (which is substantially equal to the resistor current $I_T$) is mirrored in the transistor 30 by the current mirror circuit 32, and the scaling factor β is determined according to the active area ratio of transistor 30 and transistor 32a of the current mirror circuit 32. Thus, the current in conductor 34 is the scaled PTAT current β·$I_T$ supplied to main band-gap circuit 20. The current mirror circuit 32 also forces the collector current of transistor 26 to equal that of transistor 24, so that the voltage Vref at junction 36 is a band-gap voltage—that is, the sum of $V_{BE26}$ and a scaled difference of $V_{BE26}$ and $V_{BE24}$, where $V_{BE24}$ is the base-emitter voltage of transistor 24, and $V_{BE26}$ is the base-emitter voltage of transistor 26. The transistors 24 and 26 have different current densities due to their different active areas, and the ratio of their active areas is chosen to optimize the temperature stability of Vref. The voltage Vref is impressed across the resistor 38 to establish the constant current $I_C$ in current source circuit 40, and the current $I_c$ is mirrored in the transistor 42. Thus, the current in conductor 44 is the constant current $I_c$ supplied to the main band-gap circuit 20 and to block 16 of FIG. 1.

Referring to FIG. 3, the main band-gap circuit 20 receives as inputs the three current signals $I_C$, α·$I_c$ and β·$I_T$ on lines 50, 52 and 54, and produces the high-precision curvature-compensated band-gap reference voltage $V_{BG}$ at output terminal 56. The main band-gap circuit 20 includes an input current summing junction 58, a diode 60 (the aforementioned single PN junction) connected between the summing junction 58 and ground, an operational amplifier 62 responsive to the voltage $V_{BE}$ across diode 60, two divider capacitors 64 (capacitance $C_1$) and 66 (capacitance $C_2$), an output filter capacitor 68 connected between the output terminal 56 and ground, three clock-controlled switches 70, 72 and 74, and a normally-closed calibration (CALIB) switch 76. As indicated, the states of switches 70 and 72 are dictated by the clock signal φ1, and the state of switch 74 is dictated by the clock signal φ2—that is, switches 70 and 72 are closed when φ1 is high, and switch 74 is closed when φ2 is high.

For the sake of discussion, it is initially assumed that the CALIB switch 76 is open. Under this condition, the current $I_C$ flows through diode 60 when clock signal φ2 is high, and the current $I_C$·(1+α) flows through diode 60 when clock signal φ1 is high. When φ2 is high, the amplifier 62 is un-coupled from the output terminal 56, and the output voltage is held by filter capacitor 68. Also, capacitor 64 is discharged by switch 74. The voltage across diode 60 under this condition is designated herein as $V_{BE1}$, and amplifier 62 operates as a voltage-follower, developing a corresponding voltage at its output (and across capacitor 66). When φ1 is high, the output of amplifier 62 is coupled to output terminal 56, and capacitors 64 and 66 operate as a voltage divider. The voltage across diode 60 under this condition is designated herein as $V_{BE2}$, and amplifier 62 develops voltage at its output based on $V_{BE2}$ and the capacitance ratio $C_2/C_1$. Due to the alternately differential current flowing in diode 60, and the operation of phase-clocked amplifier 62, an uncompensated band-gap reference voltage $V_{UBG}$ is developed at output terminal 56, according to equation (1) below:

$$V_{UBG} = (1 + C_2/C_1) \cdot (V_{BE2} - V_{BE1}) + V_{BE2} \quad (1)$$
$$= (1 + C_2/C_1) \cdot V_T [\ln(1+\alpha)] + V_{G0} - V_T[\gamma \cdot \ln(T/T_0)] +$$
$$V_T \cdot \ln[E \cdot (\alpha+1)I_C/I_{CN}]$$

where $V_{G0}$ is the silicon band-gap voltage of diode 60, γ is a process constant, T is an actual temperature (in °K), $T_0$ is a reference temperature, E is a constant, $V_T$=k·T/q, q is the electron charge, and k is the Boltzmann constant.

When the CALIB switch 76 is in its normally closed state, the scaled PTAT current β·$I_T$ flows through diode 60 along with the scaled and un-scaled constant currents $I_C$ and α·$I_C$ when the clock signal φ1 is high. The scaled PTAT current β·$I_T$ produces a $V_{BE2}$ component having a quadratic (i.e., second-order) relationship with temperature that curvature-compensates the uncompensated band-gap reference voltage $V_{UBG}$ for second-order non-linearity with temperature. While third and higher order non-linearities remain, they are relatively small in magnitude for temperatures between −50° C. and +150° C. In fact, testing has shown that the curvature-compensated band-gap reference voltage $V_{BG}$ exhibits a voltage variation as low as 0.1 percent over this 200° C. range of temperatures. The curvature-compensated band-gap reference voltage $V_{BG}$ is given by the following equation:

$$V_{BG}=V_{G0}+(C_2/C_1)(k\cdot T/q)\cdot \ln[(1+\alpha)+(f\cdot T)/I_C]-[(k\cdot T\cdot \gamma)/q]\cdot \ln(T/T_0)+(k\cdot T/q)\cdot \ln\{E[(1+\alpha)\cdot I_C/I_{CN}+(f\cdot T)/I_{CN}]\} \quad (2)$$

where, f=β·k1, k1=k·ln(m)/(q·R1), m is the current density ratio of bipolar transistors 24 and 26 in auxiliary band-gap circuit 14, and R1 is the resistance of resistor 28 in auxiliary band-gap circuit 14.

The voltage boost circuit 22 of FIG. 4 is essentially conventional in design. It is a phase-clocked circuit, and boosts the curvature-compensated band-gap voltage $V_{BG}$ of main band-gap circuit 20 by a scalable factor to form an elevated high-precision reference voltage $V_{3P3}$ at output terminal 80. Referring to FIG. 4, the voltage boost circuit 22 includes five clock-controlled switches 82-90. As indicated, the states of switches 82, 84 and 86 are dictated by φ1, and the states of switches 88 and 90 are dictated by φ2—that is, switches 82, 84 and 86 are closed when φ1 is high, and switches 88 and 90 are closed when φ2 is high.

When φ2 is high, the voltage boost circuit 22 is isolated from the main band-gap circuit 20, and the switches 88 and 90 discharge the capacitors 92 and 94. When φ1 is high, switch 82 couples the voltage boost circuit 22 to the main band-gap circuit 20, and capacitor 96 samples the band-gap voltage $V_{BG}$. The sampled voltage is applied to the inverting input of operational amplifier 98, which controls the conduction of a FET 100 connected between source voltage $V_{DD}$ and output terminal 80. The current sink 102 establishes a small static current flow through FET 100, but the amplifier 98 drives FET 100 to charge the capacitors 92, 94 and 104 until the voltage across capacitor 94 is equal to the sampled band-gap voltage. At this point, the voltage $V_{3P3}$ at output terminal 80 is equal to $V_{BG}\cdot[1+(C_4/C_3)]$, where $C_4$ and $C_3$ are the capacitance values of capacitors 94 and 92, respectively. When φ2 becomes high, capacitor 96 holds the previously sampled voltage, switches 88 and 90 discharge the capacitors 92 and 94, and the capacitor 104 holds the previously settled voltage value of amplifier 98 until φ1 becomes high. The capacitor 104 thus filters the dynamic response of the circuit, and the average value of $V_{3P3}$ is given by the above expression: $V_{BG} \cdot [1+(C_4/C_3)]$. The capacitors 92 and 94 are preferably fabricated as surface poly-to-poly integrated circuit devices, which characteristically exhibit very low sensitivity to packaging stress, voltage, and temperature; and the capacitance of capacitor 94 is trimable as described below in reference to the calibration flow diagram of FIG. 5.

An important aspect of the present invention is the provision of a calibration procedure whereby errors due to manufacturing process variations are corrected at any one conveniently selected temperature. Prior to calibration, the scaling parameters α and β and the capacitance ratios ($C_2/C_1$) and ($C_4/C_3$) are set based on theoretical or nominal design considerations. The scaling parameter α is set to a value that theoretically optimizes the temperature stability of the un-compensated band-gap voltage $V_{UBG}$, based on equations (1-2), for example. The scaling parameter β and the capacitance ratio ($C_2/C_1$) are set to values that theoretically provide optimal curvature compensation of $V_{UBG}$, based on equation (2), for example. And finally, the capacitance ratio ($C_4/C_3$) is set to a value that theoretically provides the desired value of output voltage $V_{3P3}$. In the calibration procedure, the scaling parameter cc and the capacitance $C_4$ are trimmed to account for any deviation between theoretical and actual considerations.

Figure 5:
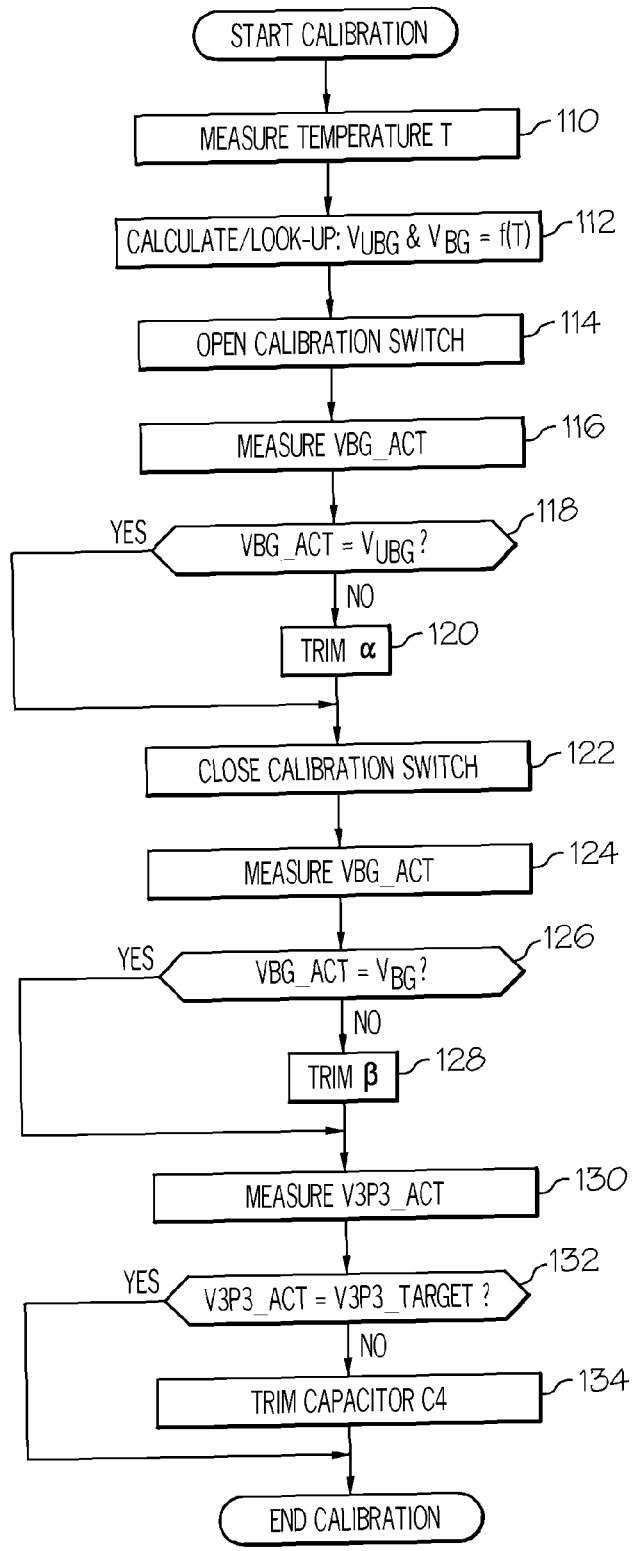
FIG. 5 is a flow diagram describing a calibration process for the voltage reference circuit of FIG. 1.

The flow diagram of FIG. 5 describes a single-temperature calibration process for successively trimming the scaling parameter α, the scaling parameter β, and the capacitance $C_4$. The scaling parameter α is trimmed by adjusting the multiplier value provided by block 16 of FIG. 1, and the capacitance $C_4$ is trimmed by a bank of trim capacitors (not shown). The scaling parameter β may be trimmed in various ways, such as by an adjustable multiplier. Referring to FIG. 5, the calibration procedure is initialized by executing blocks 110 and 112 to measure the calibration temperature T and to determine by calculation or table look-up the theoretical (i.e., nominal design) values for $V_{UBG}$ and $V_{BG}$. As indicated in FIG. 5 (and implicit in equations 1-2), both $V_{UBG}$ and $V_{BG}$ are functionally related to the measured temperature T. In a mechanization of the illustrated embodiment, $V_{UBG}$ has a nominal value of 1.116 VDC at 40° C., and $V_{BG}$ has a nominal value of 1.19 VDC at 40° C.

The calibration of scaling parameter α is illustrated by blocks 114, 116, 118, 120 and 122. The CALIB switch 76 of main band-gap circuit 20 is opened to suppress the curvature correction, and the actual voltage at output terminal 56 (designated as VBG_ACT) is measured. If VBG_ACT is not equal to the nominal un-compensated band-gap voltage $V_{UBG}$, the scaling parameter α is trimmed until equality is achieved. When VBG_ACT is equal to $V_{UBG}$, the CALIB switch 76 of main band-gap circuit 20 is closed to reapply the curvature correction.

An optional calibration of the scaling parameter 13 is illustrated by blocks 124, 126 and 128. The actual voltage VBG_ACT is re-measured and compared to the nominal curvature-compensated band-gap voltage $V_{BG}$ determined at block 112. If VBG_ACT is not equal to $V_{BG}$, the scaling parameter β is trimmed until equality is achieved.

The calibration of capacitance $C_4$ is illustrated by blocks 130, 132 and 134. The actual voltage at output terminal 80 of voltage boost circuit 22 (V3P3_ACT) is measured, and compared to its nominal or target value V3P3_TARGET. If V3P3_ACT is not equal to V3P3_TARGET, the capacitance $C_4$ is trimmed until equality is achieved. The calibration of capacitance $C_4$ is completed when V3P3_ACT is equal to V3P3_TARGET.

In summary, the present invention provides a high-precision curvature-compensated band-gap voltage reference circuit that is low in cost compared to other known circuits, easily calibrated at a single user-selected temperature, and substantially insensitive to packaging stresses. While the present invention has been described with respect to the illustrated embodiment, it is recognized that numerous modifications and variations in addition to those mentioned herein will occur to those skilled in the art. For example, the illustrated circuit elements may be implemented in various ways (e.g., as discrete devices and/or up-integrated devices), and so on. Accordingly, it is intended that the invention not be limited to the disclosed embodiment, but that it have the full scope permitted by the language of the following claims.

The invention claimed is:

1. A band-gap voltage reference circuit, comprising:
    a PN junction;
    a phase-clocked input circuit receiving first and second input currents that are substantially constant and a third input current that is proportional to absolute temperature, and alternately supplying first and second output currents to said PN junction during successive clock phases to alternately establish first and second $V_{BE}$ voltages across said PN junction; and
    a phase-clocked amplifier circuit responsive to the first and second $V_{BE}$ voltages established during said successive clock phases for producing a curvature-compensated band-gap reference voltage.

2. The band-gap voltage reference circuit of claim 1, further comprising:
    an auxiliary band-gap reference generator circuit for producing said first, second and third input currents.

3. The band-gap voltage reference circuit of claim 1, where:
    said first output current is said first input current; and
    said second output current is a sum of said first, second and third input currents.

4. The band-gap voltage reference circuit of claim 1, where:
    said first and second input currents are related by a scaling parameter; and
    said phase-clocked input circuit includes a calibration switch that suppresses said third input current in a calibration mode, during which said scaling parameter is trimmed to bring an output of said phase-clocked amplifier circuit into correspondence with a first nominal design value.

5. The band-gap voltage reference circuit of claim 4, where:
    said first nominal design value is a function of temperature during said calibration mode.

6. The band-gap voltage reference circuit of claim 4, where:
    said calibration switch is closed following the trimming of said scaling parameter, and said third input current is then trimmed to bring said curvature-compensated band-gap reference voltage into correspondence with a second nominal design value.

7. The band-gap voltage reference circuit of claim 6, where:
    said second nominal design value is a function of temperature during said calibration mode.

8. The band-gap voltage reference circuit of claim 4, where:
    the trimming of said scaling parameter at any one temperature calibrates said curvature-compensated band-gap reference voltage.

9. The band-gap voltage reference circuit of claim 1, further comprising:
    a voltage boost circuit for boosting said curvature-compensated band-gap reference voltage to form an output voltage, including a trimable device that is adjusted in value to bring said output voltage into correspondence with a target value.

* * * * *